US012523343B2

(12) United States Patent
Rebernik

(10) Patent No.: US 12,523,343 B2
(45) Date of Patent: Jan. 13, 2026

(54) SYSTEM COMPRISING A CRYOGENIC CONTAINER AND A THERMAL SIPHON

(71) Applicants: CRYOSHELTER LH2 GMBH, Dobl-Zwaring (AT); CRYOSHELTER BIOLNG GMBH, Dobl-Zwaring (AT)

(72) Inventor: Matthias Rebernik, Dobl-Zwaring (AT)

(73) Assignees: CRYOSHELTER LH2 GMBH, Dobl-Zwaring (AT); CRYOSHELTER BIOLNG GMBH, Dobl-Zwaring (AT)

( * ) Notice: Subject to any disclaimer, the term of this patent is extended or adjusted under 35 U.S.C. 154(b) by 335 days.

(21) Appl. No.: 18/251,555

(22) PCT Filed: Nov. 8, 2021

(86) PCT No.: PCT/AT2021/060418
§ 371 (c)(1),
(2) Date: May 3, 2023

(87) PCT Pub. No.: WO2022/099336
PCT Pub. Date: May 19, 2022

(65) Prior Publication Data

US 2025/0075857 A1 Mar. 6, 2025

(30) Foreign Application Priority Data

Nov. 10, 2020 (AT) .................................. 50219/2020

(51) Int. Cl.
*F17C 9/00* (2006.01)

(52) U.S. Cl.
CPC ........ *F17C 9/00* (2013.01); *F17C 2203/0391* (2013.01); *F17C 2205/0391* (2013.01); *F17C 2270/0168* (2013.01)

(58) Field of Classification Search
CPC ...... G03B 15/05; G03B 2215/05; G03B 7/08; G03B 7/09974; F17C 2201/0104;
(Continued)

(56) References Cited

U.S. PATENT DOCUMENTS 3,377,813 A 4/1968 Mordhorst
4,516,404 A * 5/1985 Laskaris ................. F17C 3/085
62/51.1

(Continued)

FOREIGN PATENT DOCUMENTS

EP 1248032 A2 10/2002
EP 3232111 A1 10/2017
WO 95/06188 A1 3/1995

OTHER PUBLICATIONS

Guckel et al. Container for a refrigerated liquefied gas, Oct. 18, 2017; eSpacenet, EP 3232111, all description (Year: 2017).*

(Continued)

*Primary Examiner* — Filip Zec
(74) *Attorney, Agent, or Firm* — Workman Nydegger

(57) ABSTRACT

A system includes a vehicle, and a cryogenic container on the vehicle and having an inner tank and an outer container which is vacuum-insulated relative to the inner tank, the system including a fluid conveying device and a pipeline that is routed out of the inner tank for the removal of cryogenic fluid and is connected to the fluid conveying device. The fluid conveying device is outside of the inner tank, the pipeline is a thermal siphon with one section rising towards the fluid conveying device, which is partially arranged in an area that is insulated relative to cryogenic fluid located in the inner tank. A vent line closable by a valve in the area, on a removal level of the fluid conveying device, is connected to the pipeline or directly to the fluid conveying (Continued)

device and routed back into the inner tank above the connection point to the pipeline.

19 Claims, 8 Drawing Sheets

(58) Field of Classification Search
CPC .......... F17C 2201/035; F17C 2201/056; F17C 2203/0391; F17C 2205/0323; F17C 2205/0326; F17C 2205/0352; F17C 2205/0355; F17C 2205/0364; F17C 2205/0391; F17C 2221/033; F17C 2223/0161; F17C 2223/033; F17C 2227/0135; F17C 2227/0178; F17C 2260/031; F17C 2260/035; F17C 2270/0168; F17C 2270/0171; F17C 9/00
See application file for complete search history.

(56) References Cited

U.S. PATENT DOCUMENTS

| | | | | |
|---|---|---|---|---|
| 4,522,034 | A * | 6/1985 | Laskaris | F17C 3/085 62/51.1 |
| 4,625,520 | A * | 12/1986 | Yagi | F17C 3/085 505/892 |
| 4,745,760 | A * | 5/1988 | Porter | F17C 3/085 62/50.7 |
| 5,218,827 | A | 6/1993 | Pevzner | |
| 5,590,695 | A * | 1/1997 | Siegele | F17C 6/00 141/63 |
| 8,113,006 | B2 * | 2/2012 | Rech | F17C 7/02 62/50.3 |
| 9,828,987 | B2 * | 11/2017 | Steffen | F02M 59/025 |
| 10,041,447 | B2 * | 8/2018 | Bean | F02M 21/0218 |
| 10,060,421 | B2 * | 8/2018 | Brown | F04B 23/06 |
| 10,451,218 | B2 * | 10/2019 | Strange | F17C 3/08 |
| 10,948,087 | B2 * | 3/2021 | Hausmann | F16K 1/303 |
| 11,312,229 | B1 * | 4/2022 | Yordanov | B32B 27/304 |
| 11,473,729 | B2 * | 10/2022 | Jones | F17C 9/00 |
| 11,499,678 | B2 * | 11/2022 | Krueger | F17C 13/083 |
| 11,926,427 | B2 * | 3/2024 | Morrison | B64U 50/19 |
| 12,110,056 | B2 * | 10/2024 | Gaessler | B62D 21/09 |
| 2014/0116396 | A1 | 5/2014 | Stockner | |
| 2014/0216403 | A1 * | 8/2014 | Stockner | F02D 41/0027 123/445 |
| 2016/0305610 | A1 * | 10/2016 | Karng | F17C 3/08 |
| 2018/0079347 | A1 * | 3/2018 | Ellis | B60P 1/6454 |
| 2021/0088173 | A1 * | 3/2021 | Radhakrishnan | B32B 15/043 |
| 2021/0129663 | A1 * | 5/2021 | Yordanov | F16M 13/02 |
| 2022/0349526 | A1 * | 11/2022 | Kubica | F17C 3/08 |

OTHER PUBLICATIONS

International Search Report, mailed Jan. 31, 2022, from PCT/AT2021/060418.

* cited by examiner

SYSTEM COMPRISING A CRYOGENIC CONTAINER AND A THERMAL SIPHON

BACKGROUND OF THE INVENTION

The invention relates to a system comprising a vehicle and a cryogenic container carried along on the vehicle, i.e., mounted to the vehicle, and comprising an inner tank and an outer container which is vacuum-insulated relative to said inner tank, the system furthermore comprising a fluid conveying device located outside of the inner tank and a pipeline that is routed out of the inner tank for the removal of cryogenic fluid and is connected to the fluid conveying device.

According to the prior art, liquefied gases can be stored in containers ("cryogenic containers") so as to be stored as a fuel for an engine of a vehicle, for example. For this purpose, the cryogenic container is carried along on the vehicle, for example, by being mounted on the vehicle frame. Liquefied gases are gases that are in the liquid state at boiling temperature, with the boiling temperature of this fluid being pressure-dependent. If such a cryogenic liquid is filled into a cryogenic container, a pressure corresponding to the boiling temperature is established, apart from thermal interactions with the cryogenic container itself.

Since the fluid stored in the cryogenic container is at a temperature that is significantly lower than the ambient temperature of the cryogenic container, said container must be designed accordingly in order to reduce heat transmissions that arise. For this purpose, it is known from the prior art to design cryogenic containers as double-walled tanks which have an inner tank and an outer container. In this case, the inner tank is accommodated in the outer container and is thermally insulated from it, e.g., by having a vacuum between the inner tank and the outer container.

It is a first general objective in the field of cryogenic containers to minimize the heat input into the cryogenic container. The heat input in the cryogenic container is directly related to a hold time of the cryogenic container, i.e., a period of time from a termination of the withdrawal of cryogenic fluid from the cryogenic container to the point in time at which the pressure in the cryogenic container reaches a predefined threshold.

It is known from the prior art to reduce the heat input from pipelines routed into the cryogenic container in that the pipeline outside of the inner tank is designed as a thermal siphon. In case of cryogenic containers, a thermal siphon functions in such a way that the cryogenic fluid is heated at the end of the pipeline that is located outside of the inner tank. As a result, the cryogenic fluid evaporates at that end of the pipeline, but is unable to flow back into the cryogenic container through the thermal siphon due to the buoyancy of the gas. As a result, there is an insulating gas cushion at the warm end of the pipeline so that the heat input into the overall system is reduced. If the thermal siphon were not provided, the gas and thus the heat would flow back into the cryogenic container after evaporation and liquid phase would constantly run into the warm area where the liquid phase would evaporate again and a permanent major heat input into the inner tank would exist.

However, this solution involving a thermal siphon is not appropriate for all applications. An insulating gas cushion is inconvenient especially for pumps, since the pumps must be at a temperature at which the cryogenic fluid will not evaporate for the cryogenic fluid to be conveyed efficiently. If cryogenic fluid were to be present in the gas phase at the pump, the efficiency of the pump would be extremely low, since the gas phase would first have to be compressed by the pump prior to delivery. Only after a long time of gas extraction, it would be possible to make sure that the suction line and the feed pump cool down to such an extent that liquid phase would not evaporate there and thus-after a long lead time-liquid phase could also be delivered with higher efficiency. This time is unacceptable to the consumer, and it is an object of the invention to reduce this time to a minimum and to allow cooling also without the engine or pump running, mainly driven by gravity.

For this reason, in the prior art, it is intended for the pump, in particular the piston of a piston pump, to be allowed to protrude into the cryogenic container so as to continuously wash cold cryogenic fluid around it. As a result, the pump can be started at any time, since the pump is always at a temperature at which the cryogenic fluid can be in the liquid state. It is therefore a second general objective in the field of cryogenic containers to provide a pump that is suitable for a rapid engine start.

It is evident that the two above-mentioned objectives, on the one hand, the low heat input and, on the other hand, the cold pump, are in conflict with one another, since a cold pump implies a high heat input into the cryogenic container.

BRIEF SUMMARY

It is therefore the object of the invention to provide a system comprising a cryogenic container and a fluid conveying device wherein, on the one hand, the heat input into the cryogenic container is low and, on the other hand, the fluid conveying device can operate quickly with high efficiency.

This object is achieved by a system comprising a cryogenic container with an inner tank and an outer container which is vacuum-insulated relative to said inner tank, the system furthermore comprising a fluid conveying device and a pipeline that is routed out of the inner tank for the removal of cryogenic fluid and is connected to the fluid conveying device, wherein the fluid conveying device is arranged outside of the inner tank, the pipeline is designed as a thermal siphon with at least one section rising towards the fluid conveying device, which is at least partially arranged in an area that is insulated with respect to the cryogenic fluid located in the inner tank, wherein a vent line that can be closed by a valve in said area, preferably on a removal level of the fluid conveying device, is connected to the pipeline or directly to the fluid conveying device and is routed back into the inner tank above the connection point to the pipeline or above the connection point to the fluid conveying device.

The solution according to the invention allows the heat input into the cryogenic container to be kept low, since a gas cushion can form between the fluid conveying device and the rising section when the valve of the vent line is closed. On the other hand, the intake area of the fluid conveying device, or, respectively, the fluid conveying device itself, can be cooled down quickly in that the valve of the vent line is opened, whereby the insulating gas cushion is brought into the cryogenic container by the buoyancy by means of the vent line and fluid phase can flow through the pipeline to the fluid conveying device.

The system can thus assume two operating states, wherein the valve is closed in a first operating state in order to keep an insulating gas cushion between the above-mentioned section and the valve on the fluid conveying device after the fluid conveying device has been heated, and wherein the valve is opened in a second operating state in order to facilitate a flow of cryogenic fluid to the fluid conveying device and, simultaneously, a discharge of cryogenic fluid in the gas phase through the vent line.

With the invention, the two initially set objectives of the invention are achieved. On the one hand, the heat input into the overall system is reduced, since the cryogenic fluid located in the area of connection to the fluid conveying device evaporates after the stop of the vehicle and does not flow back into the cryogenic container through the thermal siphon. After the initial evaporation of the cryogenic fluid, the heat input via the pipeline is reduced to a minimum. On the other hand, an engine start can also be performed as quickly as possible due to the fact that the pipeline and the intake area of the fluid conveying device can be cooled quickly by opening the valve-even without the engine or pump running and mainly driven by gravity. After the valve has been opened, liquid phase passes through the pipeline formerly acting as a thermal siphon and thereby cools the pipeline and the fluid conveying device.

According to the invention, the pipeline routed to the fluid conveying device can also be cooled down as quickly as possible. The cooling of the pipeline depends on the mass of the pipeline, the temperature difference that needs to be cooled and the heat that flows in, i.e., the quality of the insulation. According to the invention, it is envisaged that the pipeline is designed to be as short as possible, while it still allows the formation of the gas cushion. In order to achieve this, the fluid conveying device can be provided as close to the inner tank as possible so that, in the state of thermal equilibrium, i.e., after the liquid phase has evaporated in the fluid conveying device or, respectively, in the pipeline in this area, a temperature arises which is just sufficiently warmer than the temperature of the liquid phase to create the insulating gas cushion. According to the invention, it can be achieved that the pipelines in the area of the fluid conveying device heat up by only 1° C. to 5° C. compared to the temperature in the inner tank.

In a preferred embodiment, the vent line is at least partially routed between the inner tank and the outer tank in the circumferential direction of the cryogenic container and the valve preferably comprises a closure part arranged in the vent line between the inner tank and the outer tank and an actuating part arranged outside of the outer container. A recirculation of the vent line in the vacuum space reduces the overall heat input into the cryogenic container when the operating state changes, i.e., from standstill to operation and from operation to standstill. The vent line can also be located entirely between the inner tank and the outer container, for example, if the valve is divided into two parts, as described above. The connection between the closure part and the actuating part can be made mechanically or perhaps via a control line or, respectively, a wireless control.

In further preferred embodiments, the vent line is routed back into the inner tank in the upper third of the inner tank, preferably at the top point of the inner tank. Because of this, it becomes possible that no liquid gets into the vent line. Alternatively, the line could also be routed back into the container below a maximum liquid phase level, in which case the valve could be provided directly on the inner tank. The vent line could also have a thermal siphon, at its upper end, for example.

The thermal siphon can be designed in various ways. For example, the pipeline can have two essentially horizontal sections, between which a flap comprising the section rising towards the fluid conveying device is formed for the formation of the thermal siphon. This embodiment is advantageous because the flap can be easily incorporated into the pipeline without providing a separate pipe penetration module that protrudes into the inner tank.

In the last-mentioned embodiment, the pipeline can connect directly to the inner tank without protruding into it. In general, however, it could also be envisaged that the pipeline is routed into the inner tank of the cryogenic container, i.e., protrudes into it, and is surrounded inside the inner tank by a cladding pipe which insulates the pipeline with respect to a fluid located in the inner tank.

In such embodiments involving a cladding pipe, it is usually envisaged that the vacuum-insulated space located between the outer container and the inner tank also extends between the pipeline and the cladding pipe.

In the embodiment involving a cladding pipe, it is particularly preferred if the section rising towards the fluid conveying device is at least partially arranged inside the cladding pipe. As a result, the length of pipeline located outside of the inner tank can be reduced and the thermal siphon can be moved into the inner tank.

In principle, it is possible for the pipeline to have only the above-mentioned rising section or perhaps only additional horizontal or vertical sections. Between the section rising towards the fluid conveying device and the fluid conveying device, the pipeline has particularly preferably a section located within the cladding pipe and sloped towards the fluid conveying device. In this way, it becomes possible for the pipeline to have a kink within the cladding pipe, which allows thermal length changes to be compensated for in a particularly favourable manner.

Especially if the pipeline has a kink within the cladding pipe, which forms the highest point of the thermal siphon, it can be envisaged that the vent line is connected to the pipeline within the cladding pipe, is routed out of the cladding pipe inside the inner tank and is routed out of the inner tank with a separate cladding vent pipe. In this case, the vent line can start, for example, directly at the kink, thus discharging gas from the pipeline particularly effectively. As in the other embodiments, the purpose of routing the vent line out of the cryogenic container is that the valve can be provided outside of the cryogenic container in an accessible manner.

In other preferred embodiments, however, the vent line is connected to the pipeline outside of the inner tank, since the vent line can thereby be insulated more easily. This embodiment is usually provided when the highest point of the pipeline is provided on the fluid conveying device, e.g., is routed away from it horizontally.

Cryogenic containers are usually formed by a cylindrical lateral wall and two end caps, i.e., front walls, adjoining it. In the prior art, fittings are provided on the end caps, since there it is possible to route through lines more easily. The solution according to the invention now permits for the first time that a fluid conveying device can also be provided directly on the lateral wall. As a result, a lateral arrangement is created for the first time, which simultaneously allows a very low heat input and a rapid start of the fluid conveying device.

In automotive engineering in particular, the available space is extremely small so that it is preferable to arrange the fluid conveying device directly adjacent to the cryogenic container, e.g., next to the casing or next to one of the fronts walls or end caps of the cryogenic container. For example, the fluid conveying device can be designed essentially in the form of a rod and can be arranged in parallel to a longitudinal axis of the cryogenic container along the lateral surface or normally to the longitudinal axis of the cryogenic container next to the end cap.

In order to create a particularly compact design, the fluid conveying device and preferably also the section rising towards the fluid conveying device are arranged on a lateral wall of the inner tank or the outer container, with the fluid conveying device preferably being located at least partially, particularly preferably completely, in one of the gussets, which are formed by a smallest imaginary cuboid over the inner tank or the outer container. The arrangement in the gusset allows the fluid conveying device to be arranged on the cryogenic container without thereby protruding significantly laterally of, below or above the cryogenic container, for example if the cryogenic container is arranged laterally on a motor vehicle. The fluid conveying device is usually arranged in the gusset which is located at the bottom on the side facing away from the motor vehicle. Particularly preferably, the fluid conveying device is designed in the form of a rod and lies in parallel to the cryogenic container, e.g., in parallel to a longitudinally extending axis of the cryogenic container.

Alternatively, the fluid conveying device and preferably also the section rising towards the fluid conveying device can be arranged on a front wall of the inner tank or the outer container, with the fluid conveying device preferably being located at least partially, particularly preferably completely, in one of the gussets, which are formed by a smallest imaginary cuboid over the inner tank or the outer container. The gusset on the front wall is formed when the front wall has a convex design. In this case, the fluid conveying device can preferably be arranged in a vertically upright position or even in a horizontally lying position, in particular transversely to the longitudinal axis of the tank, for example, in a gusset that forms between one of the convex end caps and the above-mentioned smallest imaginary cuboid. Particularly preferably, the fluid conveying device is designed in the form of a rod and lies normally to the cryogenic container, e.g., horizontally or vertically, and normally to a longitudinally extending axis of the cryogenic container.

The two above-mentioned designs are particularly advantageous since there is very little installation space available on a vehicle, in particular for the fluid conveying device. A particularly compact system can be achieved by the two designs mentioned, and the cryogenic container and the fluid conveying device can be arranged together in the smallest possible imaginary cuboid, for example in the installation space available on the vehicle frame.

In order to allow the liquid phase of the cryogenic fluid to be removable down to the last drop, the pipeline can be attached to the lowest point of the inner tank without protruding into the inner tank and can be routed from there to the fluid conveying device. As a result, the removal quantity of the cryogenic container can be maximized, which was previously not possible in this form with the prior art. In another variant, in order to achieve this objective, the pipeline could also protrude inside, even without insulation, and could be routed out of the inner tank with a section sloped towards the fluid conveying device, with the section rising towards the fluid conveying device being provided between the above-mentioned sloped section and the fluid conveying device.

Furthermore, the fluid conveying device is preferably located in the vacuum-insulated space between the inner tank and the outer container. The outer container can thus be pulled over the fluid conveying device, as a result of which the latter can be arranged in the vacuum-insulated area. This results in a particularly good utilization of the installation space available on the vehicle, since the insulating space between the inner tank and the outer container is simultaneously used as an assembly space for the fluid conveying device. In alternative embodiments, the fluid conveying device can also be located outside of the outer container and can be insulated separately there.

In all of the above-mentioned embodiments, but especially in the aforementioned one in which the fluid conveying device is located in the vacuum-insulated space between the inner tank and the outer container, both the cryogenic container and the fluid conveying device have a rod-shaped design (which herein is understood to mean that they each have a longitudinal axis and preferably have a greater length in the longitudinal direction than in the other directions normal to the longitudinal direction), the longitudinal axis of the cryogenic container and the fluid conveying device being contained in a vertical plane lying in the normal direction of travel of the vehicle. As a result, both the cryogenic container and the fluid conveying device can be arranged on the vehicle in a compact manner. Furthermore, the longitudinal axis of the cryogenic container preferably lies in a horizontal plane and the longitudinal axis of the fluid conveying device lies in a horizontal plane or is inclined by 0.1° to 20° with respect to a horizontal plane, whereby the compact arrangement can still be achieved.

Furthermore, the fluid conveying device is preferably designed in the form of a rod and a longitudinal axis of the fluid conveying device is inclined with respect to a horizontal plane, wherein the end at which the fluid conveying device is connected to the pipeline and/or to the vent line is located higher than the end not connected to the pipeline and/or to the vent line. As a result, cryogenic fluid evaporated in or, respectively, on the fluid conveying device can be returned more easily into the cryogenic container via the extraction line.

Furthermore, it is preferred if the section rising towards the fluid conveying device rises by a height that corresponds at least to twice the diameter of the pipeline at the connection point to the fluid conveying device. As a result, a sufficient height for the presence of the gas cushion and thus the effect of the thermal siphon can be ensured. The height is defined as the difference between the top point of the upper pipe surface of the rising section and the lowest point of the lower pipe surface of the rising section. As a result, the siphon effect can be maintained even if the vehicle is parked at an angle.

It is particularly preferred if the pipeline is more flexible across at least one functional section than outside of the functional section. Alternatively or additionally, the pipeline can have a thinner wall thickness across at least one functional section than outside of the functional section, with the functional section preferably being located at least partially inside a cladding pipe. Alternatively or additionally, the pipeline can be designed as a bellows pipe across at least one functional section, with the functional section preferably being located at least partially within the cladding pipe. Depending on the embodiment, the functional section can also be located completely within the cladding pipe or, respectively, the cryogenic container or completely outside of the cladding pipe or, respectively, the cryogenic container.

These embodiments involving a functional section have the advantage that, due to the flexible design, the thinning of the pipeline wall thickness and/or the design as a bellows pipe, fewer or no vibrations caused by the vehicle are transmitted to the fluid conveying device. Hence, this is a vehicle-specific advantage. The functional section is usually provided for the pipeline since the latter has a large diameter in relation to its length and is therefore rigid. Due to its typically long length and smaller diameter, the vent line is less rigid so that less vibrations are transmitted to the fluid conveying device. In general, however, all the above-mentioned variants of the functional section of the line could also be provided for the vent line, i.e., the vent line can have a functional section as described above for the pipeline.

BRIEF DESCRIPTION OF THE DRAWINGS

Advantageous and non-limiting embodiments of the invention are explained in further detail below with reference to the drawings.

DETAILED DESCRIPTION

Figure 1:
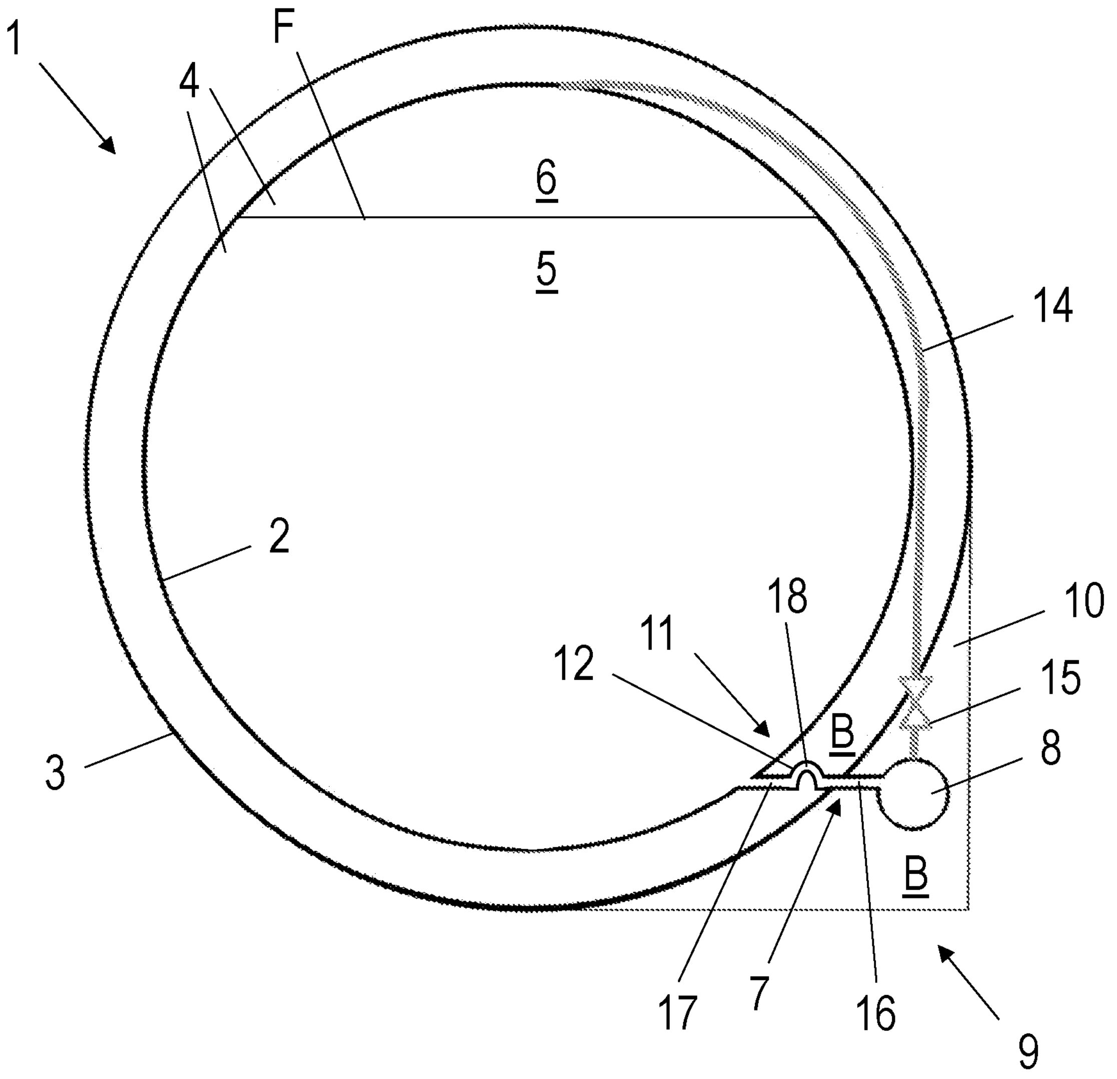
FIG. 1 shows a system according to the invention comprising a cryogenic container and a pipeline designed as a thermal siphon in a first embodiment variant.

FIG. 1 shows a cryogenic container 1 which has an inner tank 2 and an outer container 3 which is vacuum-insulated relative to said inner tank. The cryogenic fluid 4 stored in the cryogenic container 1 is, for example, liquefied natural gas, also known to those skilled in the art as LNG ("Liquid Natural Gas"). In the illustrated example, the cryogenic fluid 4 is in the liquid phase 5 up to a filling level F, and beyond that in the gas phase 6. The cryogenic container 1 is carried along on a motor vehicle, in which case the cryogenic fluid 4 serves, for example, as a fuel for an engine of the motor vehicle. For this purpose, an extraction line of the cryogenic container can be connected to the engine. The cryogenic container 1 is usually mounted to the vehicle frame of the vehicle, with a longitudinally extending axis of the cryogenic container 1 lying essentially horizontally and in parallel to the vehicle frame, i.e., in parallel to a normal direction of travel of the vehicle.

For example, the cryogenic container 1 may have a cylindrical shape, i.e., comprise a cylindrical casing terminated by two planar or convex end caps. Thus, the cryogenic container 1 generally has a longitudinally extending axis which can coincide with the cylinder axis of the cryogenic container 1. In general, however, the cryogenic container 1 or, respectively, its casing does not have to exhibit, in section, a circular cross-section normal to the longitudinally extending axis.

For introducing cryogenic fluid 4 into the cryogenic container 1 or removing cryogenic fluid 4 from it, a pipeline 7 is provided between the inner tank 2 and the outer container 3. Additional lines for introducing cryogenic fluid into the tank or, respectively, removing it therefrom are not illustrated for reasons of clarity.

For the delivery of cryogenic fluid 4, a fluid conveying device 8, preferably a pump such as a piston pump or centrifugal pump, or, respectively, the inflow area or suction area thereof, is furthermore connected to the pipeline 7. The cryogenic container 1, the pipeline 7 and the fluid conveying device 8 are together, optionally with further components, referred to as the system 9. The fluid conveying device 8 is preferably arranged directly on a lateral surface of the cryogenic container 1 so that the pipeline 7 can also be connected directly, i.e., without an intermediate system, to the fluid conveying device 8. In this variant, the fluid conveying device 8 lies, for example, in parallel to the longitudinally extending axis of the cryogenic container 1. In other embodiments, the fluid conveying device 8 can also be arranged on a front side of the cryogenic container 1, e.g., in a vertically upright position or in a horizontally lying position. In this variant, the fluid conveying device 8 lies, for example, normally to the longitudinally extending axis of the cryogenic container 1. The fluid conveying device 8 can deliver at least one liquid phase 5, pumping it, for example. If the fluid conveying device 8 can also deliver a gas phase 6, the fluid conveying device 8 has a higher efficiency for delivering the liquid phase 5 than for delivering the gas phase 6, for example.

As is known to those skilled in the art, the cryogenic fluid 4 is stored in the inner tank 2 at very low temperatures. The temperature inside the inner tank 2 is therefore lower than outside of the inner tank 2. During operation, the fluid conveying device 8 is cooled by the liquid cryogenic fluid 4 running through the fluid conveying device 8. When the fluid conveying device 8 is in operation, it thus has a temperature which essentially corresponds to the temperature of the liquid phase 5. However, when the fluid conveying device 8 is not in operation, it heats up due to the input of heat from the outside so that the cryogenic fluid 4 located in the fluid conveying device 8 or, respectively, in the pipeline 7 evaporates near the fluid conveying device 8 and a gas phase 6 forms there. If the pipeline 7 were not designed as a thermal siphon as described below, the cryogenic fluid 4 would constantly be converted into the gas phase 6 in the vicinity of the fluid conveying device 8 and would flow back into the inner tank 2, which implies a significant heat input. Although the fluid conveying device 8 can also be arranged between the inner tank 2 and the outer container 3 or within an insulation 10 in order to enclose the fluid conveying device 8 between the outer container 3 and the insulation 10, e.g., in a vacuum, the heat input into the fluid conveying device 8 cannot be completely prevented in this way.

For this reason, the pipeline 7 is designed as a thermal siphon 11. The thermal siphon 11 has at least one section 12 rising towards the fluid conveying device, which is at least partially arranged in an area B that is insulated with respect to the cryogenic fluid 4 located in the inner tank 2, i.e., is not directly surrounded by cryogenic fluid 4 washing around it. The area B is thus located outside of the inner tank 2 or optionally also inside the inner tank 2 if said tank has an insulated indentation such as a cladding pipe 19, which will be described in further detail below:

In case of heat input from the outside, area B, and hence also the part of section 12 or pipeline 7 located within area B, will thus have a higher temperature than the cryogenic fluid 4 located in the inner tank 2. The cryogenic fluid 4, which is in the liquid phase 5 there, will therefore evaporate first from the outside due to the heat input. Due to the buoyancy of the gas phase 6 compared to the liquid phase 5, an insulating gas cushion will exist on the fluid conveying device 8 because of the rising section 12, usually up to the rising section 12.

However, if the fluid conveying device 8 has not been in operation for a certain period of time, i.e., has not warmed up, and the insulating gas cushion is present on the fluid conveying device 8, it will not be able to deliver cryogenic fluid 1 or will do so only with poor efficiency. According to the invention, a vent line 14 is therefore provided, which is connected to the pipeline 7 or directly to the fluid conveying device 8 in said area B, preferably on a removal level of the fluid conveying device 8, and is routed back into the cryogenic container 1. If the vent line 14 is connected to the pipeline 7, then preferably directly adjacent to the fluid conveying device 8, e.g., to a part of the pipeline 7 that is horizontally routed away from the fluid conveying device 8 or, if the section 12 starts directly at the fluid conveying device 8, to the top point of section 12.

The vent line 14 comprises a valve 15, i.e., a shut-off valve, by means of which the vent line 14 can be selectively shut off and opened. If the valve 15 in the vent line 14 is closed, the thermal siphon 11 can fulfill its insulating function, as outlined above. However, if the valve 15 is opened, the gas phase 6 flows from the pipeline 7 via the vent line 14 back into the inner tank 2, i.e., the thermal siphon 11 can no longer fulfill its function. As a result, fluid phase 5 flows from the inner tank 2 into the pipeline 7 towards the fluid conveying device 8. The fluid conveying device 8 cools down particularly quickly due to the liquid phase 5 flowing in, as a result of which the liquid phase 5 can be pumped after sufficient cooling.

The vent line 14 is routed back into the inner tank 2, for example above the connection point of the vent line 14 to the pipeline 7, above the section 12 rising towards the fluid conveying device 8, in the upper third of the cryogenic container 1 or at the top point of the cryogenic container 1. The vent line 14 is preferably designed so as to rise steadily, starting from the point of connection to the pipeline 7, at least up to a height at which the connection point to the inner tank 2 is located, in order to reduce the risk of forming a siphon itself.

As shown in FIG. 1, the vent line 14 can be routed at least partially in the vacuum-insulated area between the inner tank 2 and the outer container 3 in order to provide the best possible insulation for the vent line 14. The vent line 14 is preferably arranged only in the area of the valve 15 outside of the outer container 3 and/or the insulation 10. Alternatively, only the valve 15 can be arranged outside of the outer container 3 and/or the insulation 10. In other embodiments, the entire vent line 14 and also the valve 15 can be arranged within the vacuum-insulated area between the inner tank 2 and the outer container 3 and/or within the insulation 10. In this case, the valve 15 can have a control line that is routed out of the outer container 3 or, respectively, the insulation 10 so that the valve 15 can be closed mechanically, pneumatically, or electrically from the outside.

Various types of thermal siphons 10 which can be used for the system according to the invention will now be explained with reference to FIGS. 1 to 5. However, the invention is not limited to these embodiments, but other thermal siphons, which are not illustrated, can also be used.

FIG. 1 shows a classic thermal siphon 11 comprising two essentially horizontal sections 16, 17 with an flap 18. The part of the flap 18 applied to the fluid conveying device 8 forms the section 12 rising towards the fluid conveying device 8 and preventing the fluid phase 5 from flowing in towards the fluid conveying device. If a gas phase 6 now forms on the fluid conveying device 8, it will first accumulate in the upper end of the flap 18, filling it up, thereby forming a buffer between liquid phases 5 in the two horizontal sections 16,17. Thereupon, the remaining liquid phase 5 in the horizontal section 17, which faces the fluid conveying device 8, will be converted into the gas phase 6 and, if necessary, will exit from the thermal siphon 11 into the cryogenic container 1 in the direction of the latter.

In the embodiment of FIG. 1, the pipeline 7 starts at the inner tank 2, but does not enter it. However, it can be envisaged that the pipeline 7 enters the inner tank 2, in which case it is surrounded by a cladding pipe 19, as illustrated in FIGS. 2 to 5. The cladding pipe 19 insulates the pipeline 7 with respect to a fluid located in the inner tank 2, i.e., cryogenic fluid 4, when the cryogenic container 1 is filled. For example, the inner tank 2 is perforated at the point where the cladding pipe 19 starts so that the vacuum-insulated area between the inner tank 2 and the outer container 3 also extends to the area between the pipeline 7 and the cladding pipe 19. Alternatively, the area between the pipeline 7 and the cladding pipe 19 could also be insulated in a different way.

Figure 2:
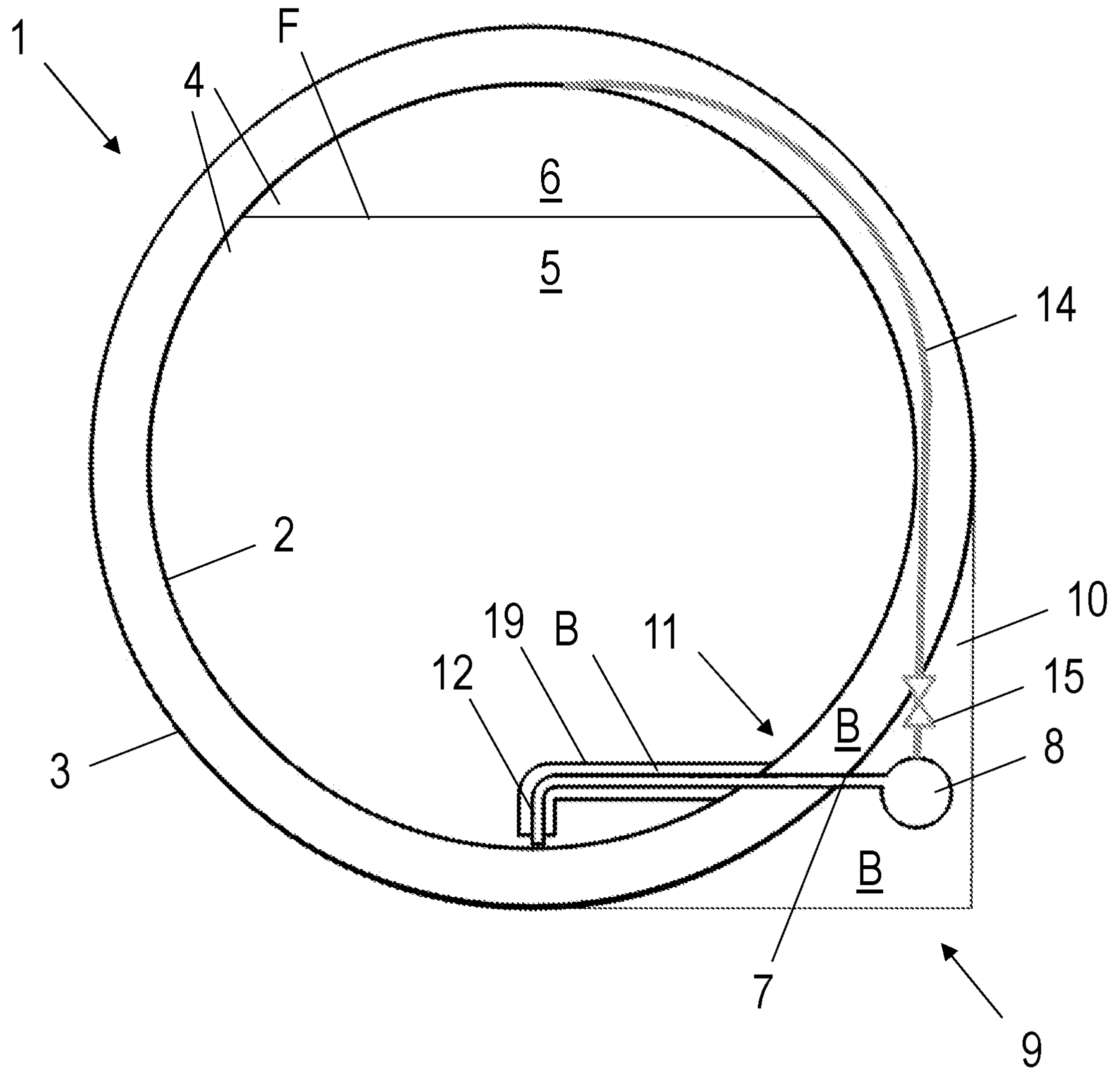
FIG. 2 shows the system according to the invention in a second embodiment variant.

FIG. 2 shows an embodiment in which the pipeline comprises an essentially horizontal section, which faces the fluid conveying device 8, and an essentially vertical section, which faces away from fluid conveying device 8 and forms the section 12 rising towards the fluid conveying device 8. Since the vertical section 12 rising towards the fluid conveying device 8 is surrounded by the cladding pipe 19, it is located in area B, which is insulated with respect to the cryogenic fluid 4 located in the inner tank 2. As in FIG. 1, the vent line 14 starts at the fluid conveying device 8 and is routed essentially completely in the vacuum-insulated area between the inner tank 2 and the outer container 3, except for a section in which the valve 15 is located.

Figure 3:
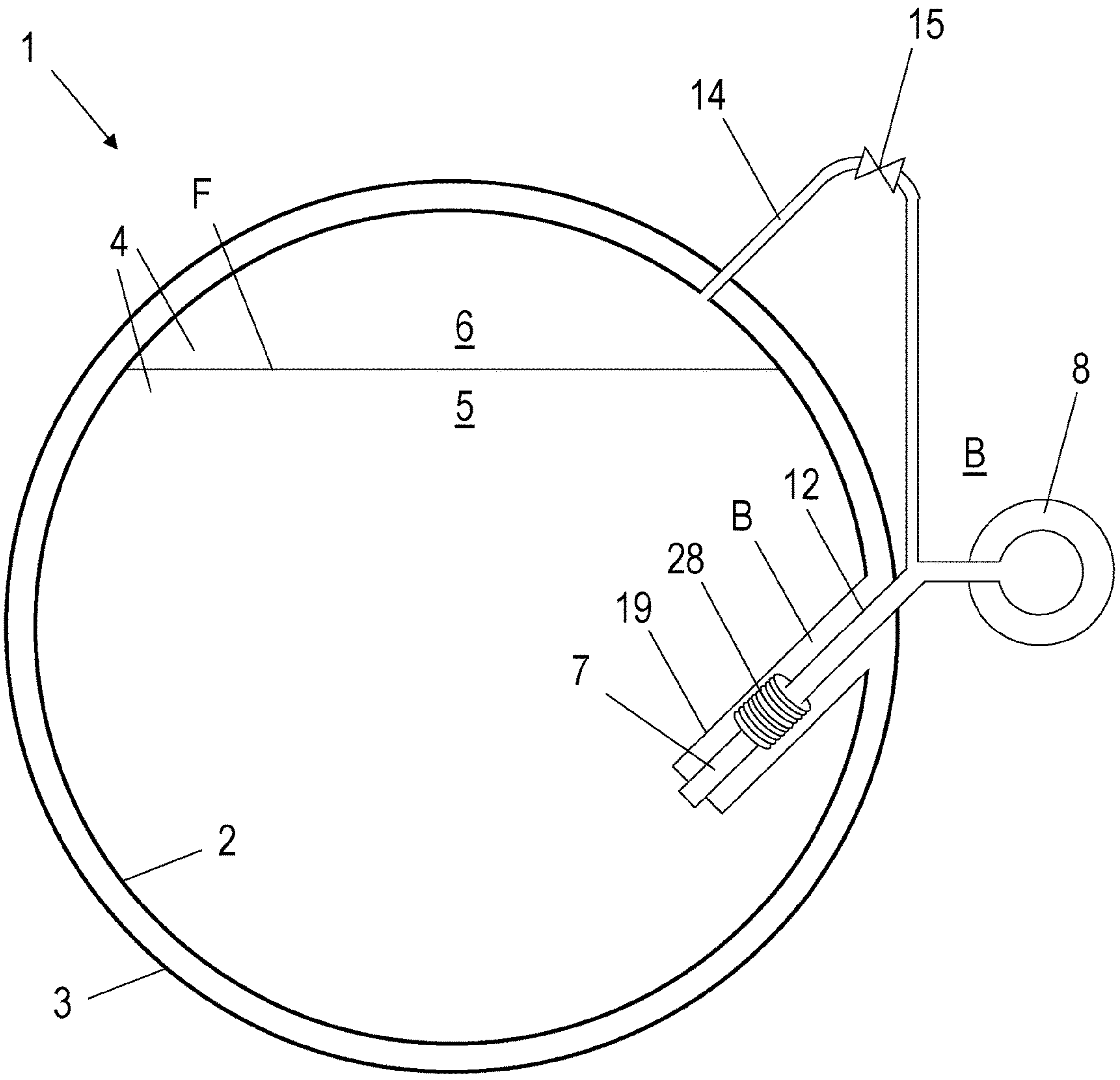
FIG. 3 shows the system according to the invention in a third embodiment variant.

FIG. 3 shows an embodiment in which the pipeline 7 within the inner tank 2 is designed so as to be straight, but rising towards the fluid conveying device 8, starting from the inner tank 2. The vent line 14 starts at a highest point of the descending pipeline 7, i.e., on a removal level of the fluid conveying device 8. The insulation of the vent line 14 is not illustrated for reasons of clarity.

Furthermore, a functional section 28 of the pipeline on which the pipeline 7 is more flexible than outside of the functional section 28 is depicted in FIG. 3. In the illustrated example, the functional section 28 is designed as a bellows pipe. However, the bellows pipe could also be designed in such a way that it is not necessarily more flexible, but allows compression or, respectively, expansion in the longitudinal direction of the pipeline 7. Alternatively, the functional section 28 could be constructed by a local thinning of the pipeline 7, whereby a flexible section is formed. As a result, the transmission of vibrations from the vehicle and thus from the cryogenic container 1 to the fluid conveying device 8 can be avoided or, respectively, reduced. The functional section is not specific to the embodiment of FIG. 3, but can be combined with all other embodiments described herein. In addition, the functional section 28 can be located completely or partially inside or completely outside of the cryogenic container 1 (i.e., of the cylindrical contour of the cryogenic container 1).

Figure 4:
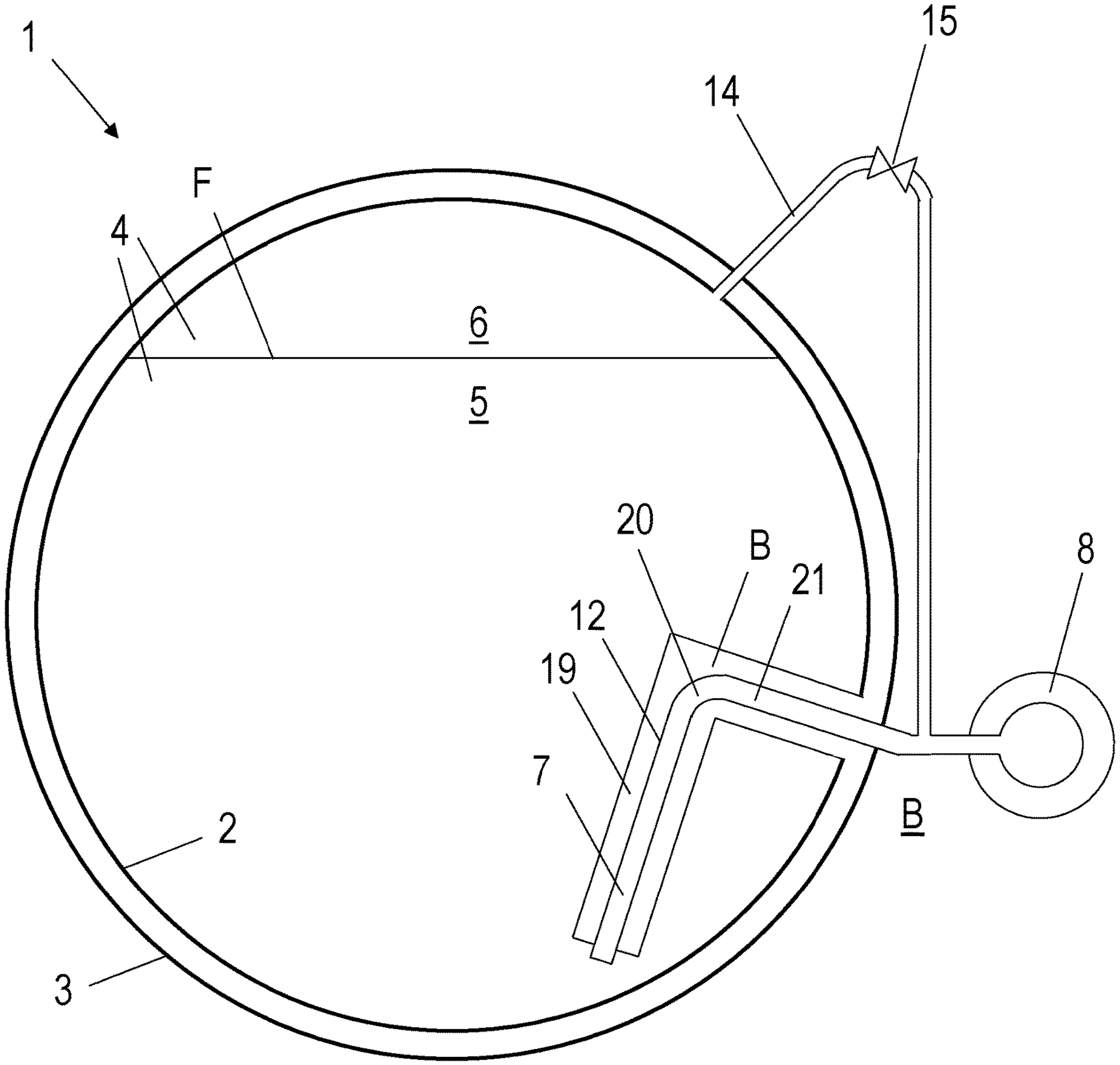
FIG. 4 shows the system according to the invention in a fourth embodiment variant.
Figure 5:
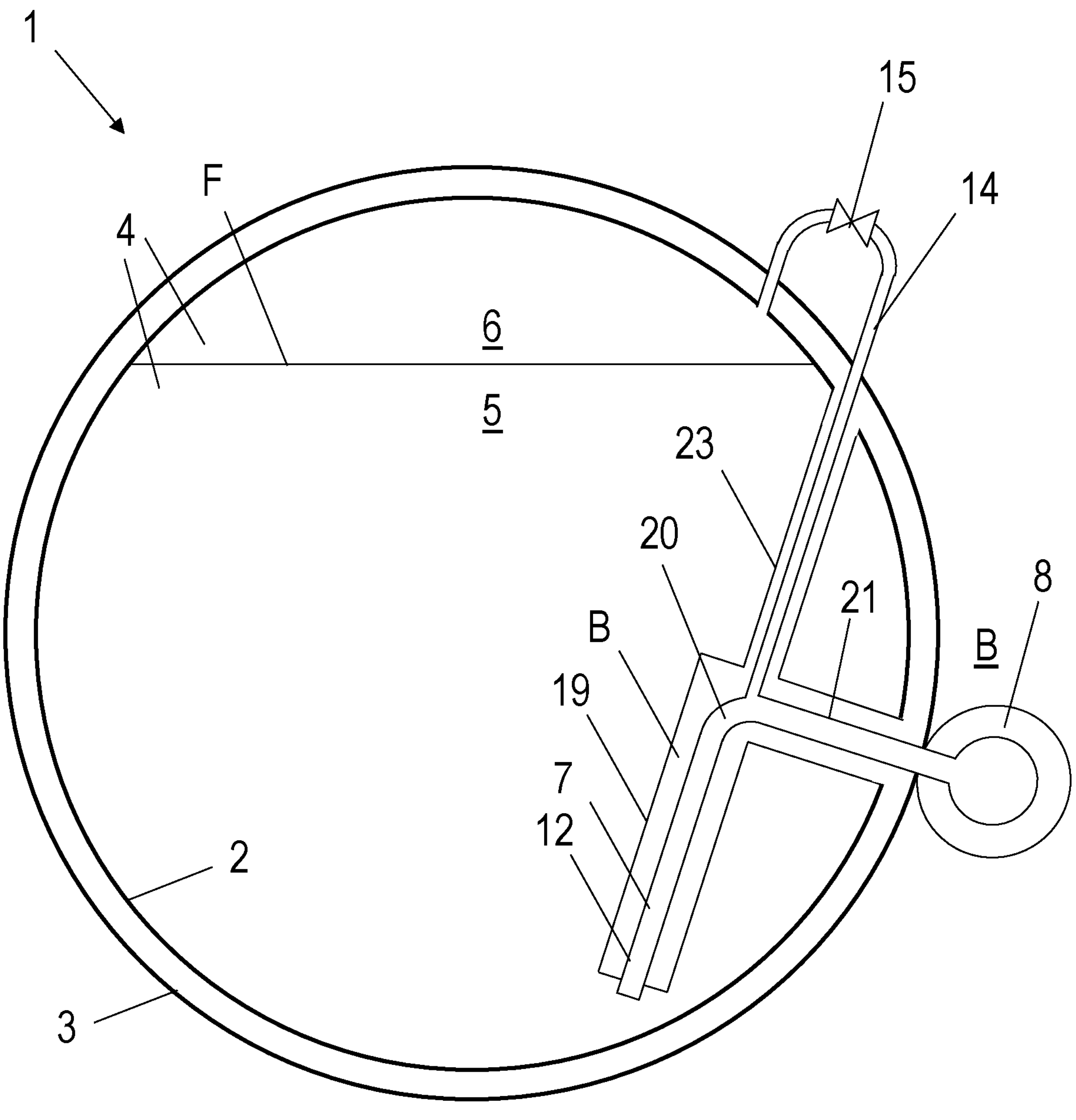
FIG. 5 shows the system according to the invention in a fifth embodiment variant.

FIGS. 4 and 5 show embodiments of the thermal siphon 10 that are particularly practice-relevant. In these embodiments, the pipeline 7 has a kink 20 located inside the cladding pipe 19. Since the pipeline 7 is not connected to the inner tank 2, but to the cladding pipe 19 on the side facing away from the fluid conveying device 8, temperature-related longitudinal expansions can be absorbed particularly well by the pipeline 7. In the two illustrated embodiments, the pipeline 7 has a section 12 rising towards the fluid conveying device 8 and a section 21 sloped towards the fluid conveying device 8. The kink 20 is formed between the two sections 12, 21. The section 21 sloped towards the fluid conveying device 8 is arranged between the fluid conveying device 8 and the section 12 rising towards the fluid conveying device 8.

In the embodiment of FIG. 4, the vent line 14 starts at a point of the pipeline 7 that is located outside of the inner tank 2 on a removal level of the fluid conveying device 8. It is generally preferred if the vent line 14 starts at a point of the pipeline 7 that is located on the removal level of the fluid conveying device 8 or above, i.e., between the fluid conveying device 8 and a highest point of a section 21 sloped towards the fluid conveying device 8. The insulation of the vent line 14 can be done like in the embodiments discussed above.

In FIG. 5, the vent line 14 is connected to the pipeline 7 at a point that is located inside the inner tank 2. Moreover, the vent line 14 is not routed out of the inner tank 2 within the cladding pipe 18, but the vent line 14 is routed out of the cladding pipe 14 within the inner tank 2. In order to insulate the vent line 14 in this case with respect to the cryogenic fluid 1 in the inner tank 2, the vent line 14 is routed out of the inner tank 2 with a separate cladding vent pipe 23. Since the vent line 14 is routed out of the inner tank 2 and through the outer tank 3, it exhibits the valve 15 there, which is thus accessible. The vent line 14 is then routed back into the inner tank 2 in a known manner.

Figure 6:
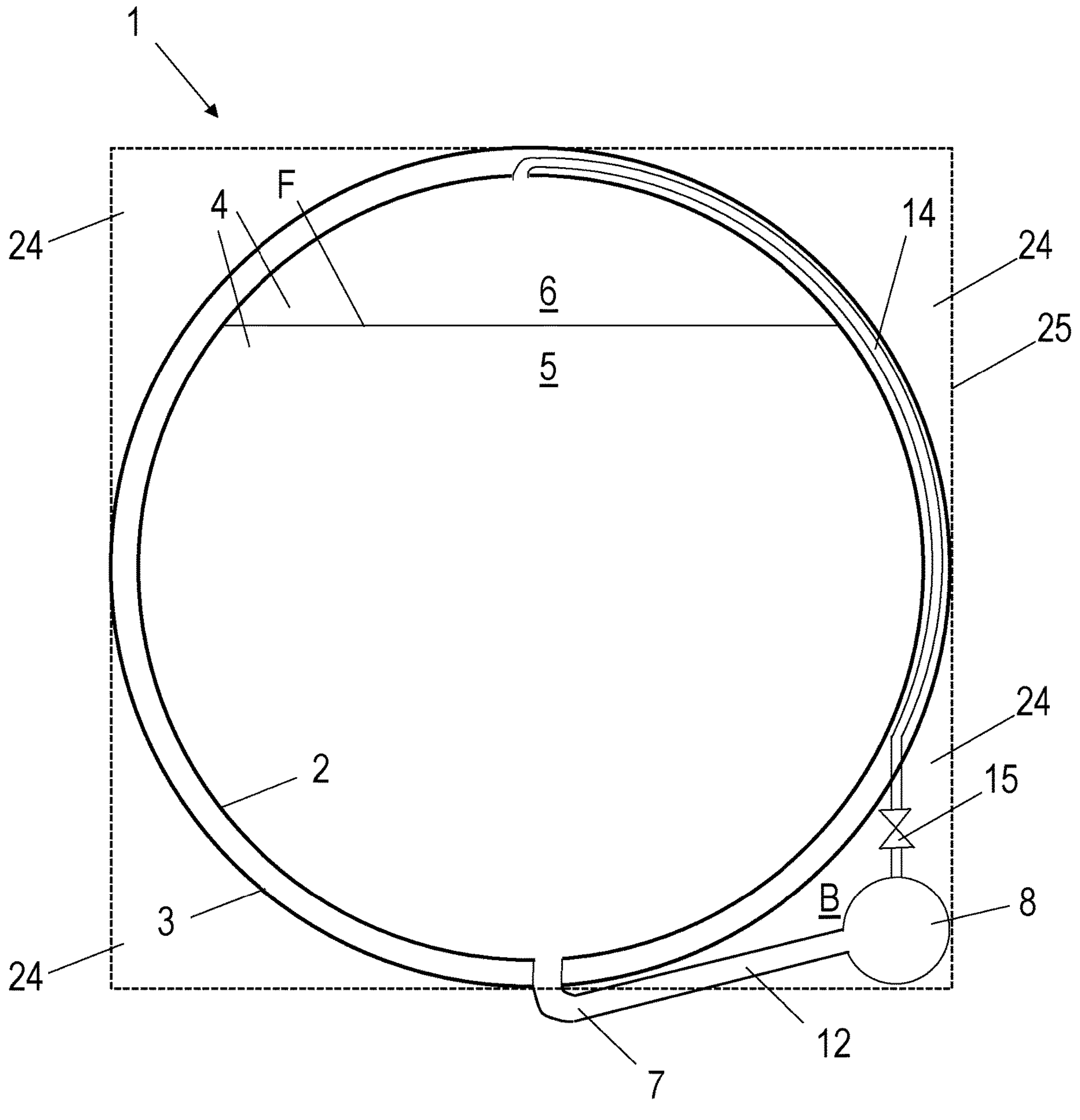
FIG. 6 shows the system according to the invention in a sixth embodiment variant.

FIG. 6 shows an embodiment in which as much cryogenic fluid 4 as possible can be removed from the inner tank 2 and the pipeline 7 is designed so as to be as short as possible. In this case, the removal level of the fluid conveying device 8 is essentially flush with the lowest point of the inner tank 2. In this case, the end of the pipeline 7 that faces away from the fluid conveying device 8 preferably starts at the lowest point of the inner tank 1.

The fluid conveying device 8 is arranged entirely in one of the gussets 24, which are formed by a smallest imaginary cuboid 25 over the inner tank 2 or the outer container 3, e.g., in a gusset 24 next to the lateral wall, as is illustrated, or in a gusset on a convex end cap. This is advantageous especially if the fluid conveying device 8 is rod-shaped and not longer than the lateral surface, when the fluid conveying device 8 is arranged in a gusset 24 next to the lateral surface, or is not longer than the diameter of the inner tank 2 or, respectively, the outer container 3, when the fluid conveying device 8 is arranged in a gusset 24 next to the end cap.

The fluid conveying device 8 could also be located only partially in one of the gussets 24 and could thereby protrude over the side or, respectively, underside of the cryogenic container 1. In the embodiment of FIG. 6, it is shown that the pipeline 7 can also be routed partially outside of the cuboid 25, although this can also be avoided by the pipeline 7 entering into the space between the outer container 3 and the inner tank 2 already laterally, for example.

It is generally preferred if the fluid conveying device 8 is arranged as far down as possible in order to deliver as much cryogenic fluid 4 as possible. The fluid conveying device 8 or, respectively, its inlet opening is preferably located below a level delimited by the bottom third or the bottom fifth of the cryogenic container 1, and/or the end of the pipeline 7 that faces away from the fluid conveying device 8 preferably starts at a point of the inner tank 1 that is located below a level delimited by the bottom third or the bottom fifth of the cryogenic container 1.

Figure 7:
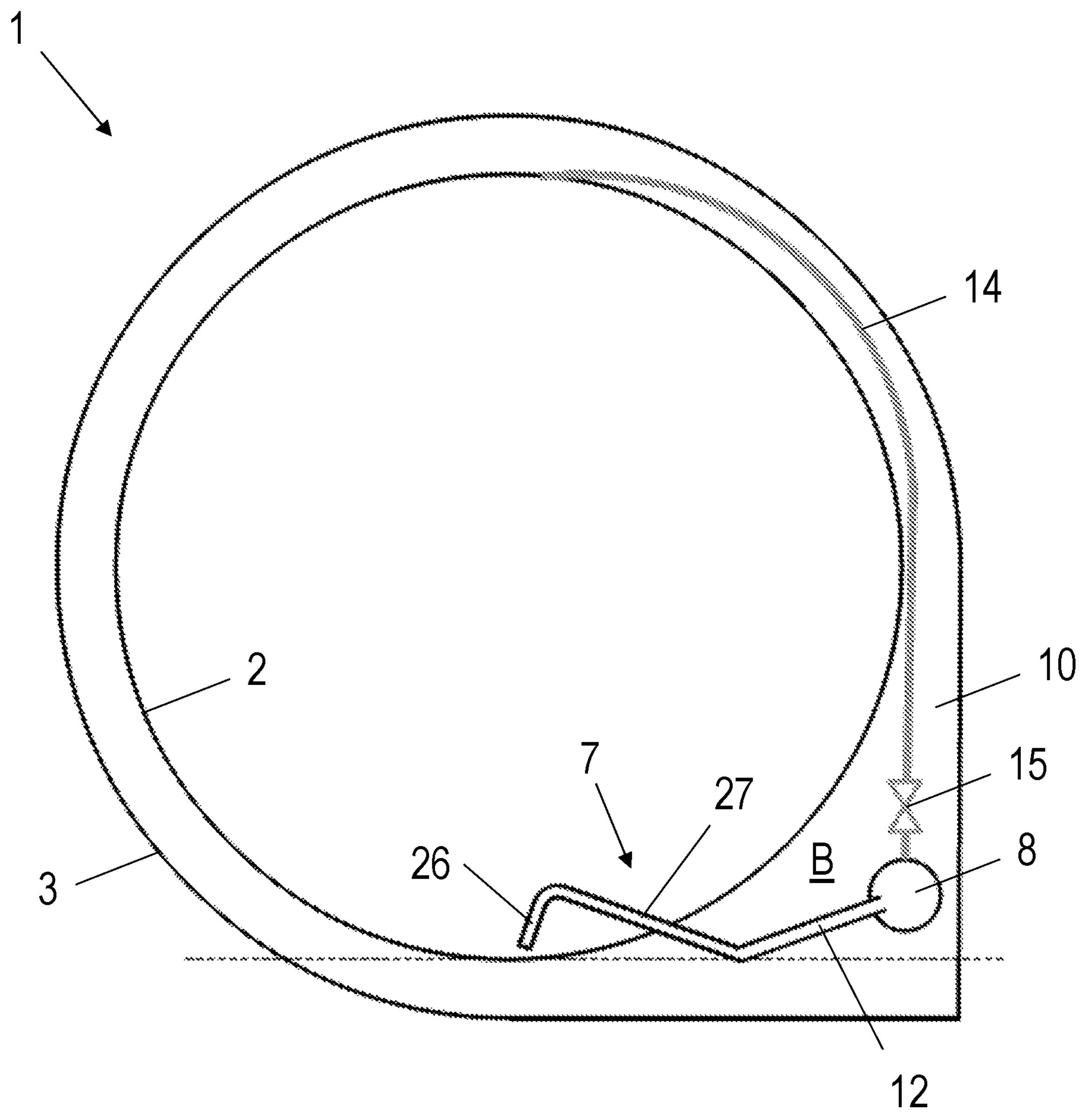
FIG. 7 shows the system according to the invention in a seventh embodiment variant.

FIG. 7 also shows an embodiment in which as much cryogenic fluid 4 as possible is removable from the inner tank 2. For this purpose, a pipeline 7 is used which protrudes into the inner tank 2 and has a section 26 that is located inside the inner tank 2 and is vertical or rising towards the fluid conveying device 8, with the end of said section starting at the lowest point of the inner container 2, the end facing away from the fluid conveying device 8. A section 27 sloped towards the fluid conveying device 8 is connected to the section 26 and is routed down to a depth which essentially corresponds to the lowest point of the inner container 2. The section 12 rising towards the fluid conveying device 8 is provided between the section 27 and the fluid conveying device 8. Since the section 12 rising towards the fluid conveying device 8 is located entirely outside of the inner container 2, the part of the pipeline 7 that is located inside the inner tank 2 can also be designed without a cladding pipe.

Figure 8:
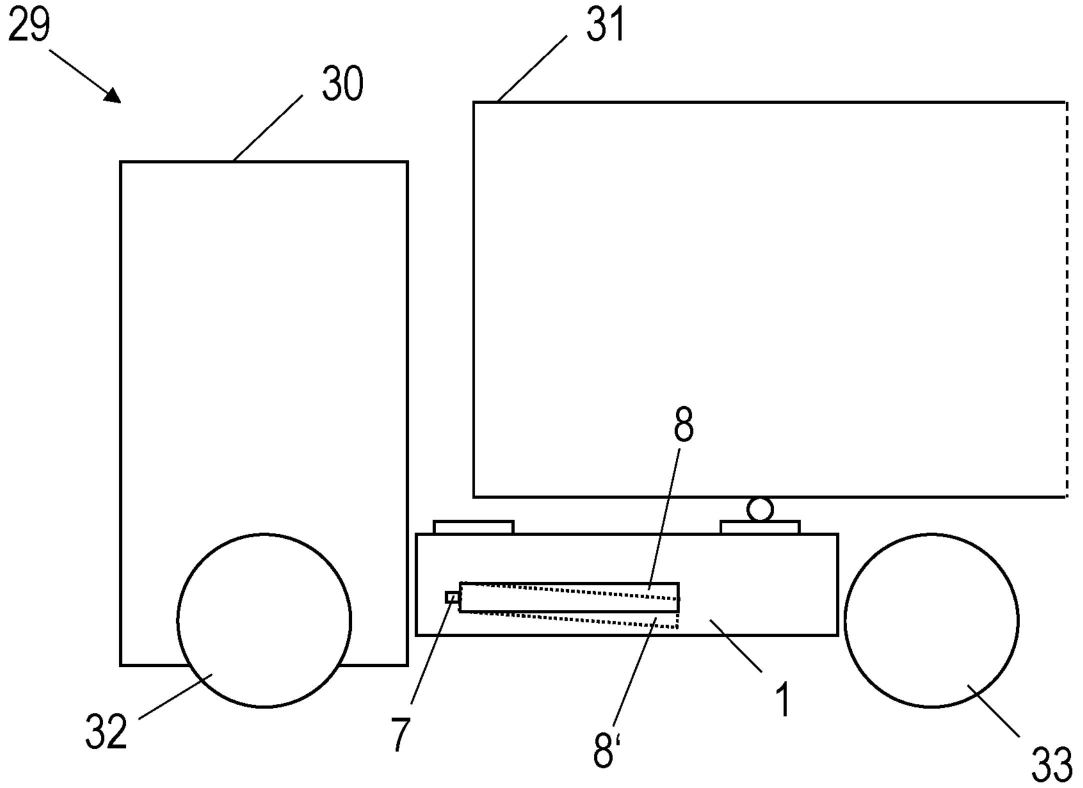
FIG. 8 shows a vehicle with a cryogenic container and a fluid conveying device in the arrangement according to the invention.

FIG. 8 shows an exemplary arrangement of the cryogenic container 1 on a vehicle 29. The vehicle 29 has a driver's cab 30, a semi-trailer 31, a front wheel 32 and a rear wheel 33. The cryogenic container 1 is mounted laterally on a vehicle frame, which is not illustrated any further, so that, for example, one cryogenic container 1 can be mounted on one side of the vehicle 29 (e.g., the driver's side) and another cryogenic container 1 can be mounted on the other side of the vehicle 29 (e.g., on the passenger side). The cryogenic container 1 is usually mounted between the front wheel 32 and the rear wheel 33. However, the cryogenic container 1 could also be mounted centrally on the vehicle directly behind the driver's cab or on a vehicle roof. However, the invention is not limited to the specific arrangement and could also be combined with other types of vehicles, e.g., without a semi-trailer 31 or on a bus.

In FIG. 8, the preferred embodiment can be seen in which both the cryogenic container 1 and the fluid conveying device 8 have a rod-shaped design, i.e., have a longitudinal axis. The fluid conveying device 8 is arranged on the side of the cryogenic container 1 facing away from or towards the vehicle frame. The longitudinal axis of the cryogenic container 1 lies essentially in parallel to a normal direction of travel of the vehicle 29, i.e., a direction of travel when the vehicle 29 is moving straight ahead. Particularly preferably, the longitudinal axis of the fluid conveying device 8 also lies in parallel to the normal direction of travel and thus in parallel to the longitudinal axis of the cryogenic container 1. A particularly compact arrangement can thereby be achieved, since the fluid conveying device 8 will de facto not occupy any additional space on the vehicle 1, as can be seen, for example, by looking at FIGS. 7 and 8 in combination, since the fluid conveying device 8 protrudes neither laterally nor forward or backward, neither above nor below the cryogenic container 1. In the example of FIG. 8, the fluid conveying device 8 and also the section 12 rising towards the fluid conveying device 8 are arranged on a lateral wall of the outer container 3, with the fluid conveying device 8 being located entirely in one of the gussets 24, which is formed by a smallest imaginary cuboid 25 above the outer container 3. In addition, as shown in FIG. 7, the fluid conveying device 8 could also be located in the insulated space between the inner container 2 and the outer container 3, as shown in FIG. 7, so that further space gain is created, on top of the improved insulation.

Furthermore, in FIG. 8, an alternative arrangement of a fluid conveying device 8' is depicted by the dashed lines, which is inclined with respect to a horizontal plane. Said fluid conveying device 8' is in turn designed in the form of a rod and therefore has a longitudinal axis. The longitudinal axis of the fluid conveying device 8' lies in a vertical plane, in which also the longitudinal axis of the cryogenic container 1 or, respectively, the normal direction of travel of the vehicle 29 is contained. However, the longitudinal axis of the fluid conveying device 8' is inclined in relation to a horizontal plane in such a way that the end at which the fluid conveying device 8' is connected to the pipeline 7 and/or to the vent line 14 is located higher than the end not connected to the pipeline 7 and/or to the vent line 14. The higher-located end can be in or against the normal direction of travel of the vehicle 29. The inclination of the fluid conveying device 8' favours the discharge of evaporated cryogenic fluid via the vent line 14. This inclination could also be used in embodiments other than that shown in FIG. 8. In order to achieve compact embodiments, the inclination is preferably at most 30°, at most 20°, at most 10°, at most 5°, at most 3° or at most 1° with respect to the horizontal plane.

The invention claimed is:

1. A system comprising a vehicle and a cryogenic container carried along on the vehicle and comprising an inner tank and an outer container which is vacuum-insulated relative to said inner tank, the system furthermore comprising a fluid conveying device and a pipeline that is routed out of the inner tank for the removal of cryogenic fluid and is connected to the fluid conveying device, wherein the fluid conveying device is arranged outside of the inner tank, the pipeline comprises a thermal siphon with at least one section rising towards the fluid conveying device, which is at least partially arranged in an area that is insulated with respect to the cryogenic fluid located in the inner tank, wherein a vent line that can be closed by a valve in said area, on a removal level of the fluid conveying device, is connected to the pipeline or directly to the fluid conveying device and is routed back into the inner tank above the connection point to the pipeline or above the connection point to the fluid conveying device, and wherein the fluid conveying device is arranged on a lateral wall of the inner tank or the outer container.

2. A system according to claim 1, wherein the vent line is at least partially routed between the inner tank and the outer tank and the valve comprises a closure part arranged in the vent line between the inner tank and the outer tank and an actuating part arranged outside of the outer container.

3. A system according to claim 1, wherein the vent line is routed back into the inner tank in the upper third of the inner tank, at the top point of the inner tank.

4. A system according to claim 1, wherein the pipeline has two horizontal sections, between which a flap comprising the section rising towards the fluid conveying device is formed for the formation of the thermal siphon.

5. A system according to claim 1, wherein the pipeline is routed into the inner tank and is at least partially surrounded inside the inner tank by a cladding pipe which insulates the pipeline with respect to a fluid located in the inner tank, with the vacuum-insulated space located between the outer container and the inner tank also extending between the pipeline and the cladding pipe.

6. A system according to claim 5, wherein the section rising towards the fluid conveying device is at least partially arranged inside the cladding pipe.

7. A system according to claim 6, wherein, between the section rising towards the fluid conveying device and the fluid conveying device, the pipeline has a section located within the cladding pipe and sloped towards the fluid conveying device.

8. A system according to claim 5, wherein the vent line is connected to the pipeline within the cladding pipe, is routed out of the cladding pipe inside the inner tank and is routed out of the inner tank with a separate cladding vent pipe.

9. A system according to claim 1, wherein the vent line is connected to the pipeline outside of the inner tank.

10. A system according to claim 1, wherein the section rising towards the fluid conveying device is arranged on a lateral wall of the inner tank or the outer container.

11. A system according to claim 1, wherein the pipeline is attached to the lowest point of the inner tank and is routed from there to the fluid conveying device.

12. A system according to claim 1, wherein the fluid conveying device is located in the vacuum-insulated space between the inner tank and the outer container.

13. A system according to claim 1, wherein both the cryogenic container and the fluid conveying device have a rod-shaped design and the cryogenic container and the fluid conveying device have a longitudinal axis contained in a vertical plane lying in the normal direction of travel of the vehicle.

14. A system according to claim 1, wherein the fluid conveying device is comprises a form of a rod and a longitudinal axis of the fluid conveying device is inclined with respect to a horizontal plane, wherein the end at which the fluid conveying device is connected to the pipeline and/or to the vent line is located higher than the end not connected to the pipeline and/or to the vent line.

15. A system according to claim 1, wherein the section rising towards the fluid conveying device rises within the area by a height that corresponds at least to twice the diameter of the pipeline at the connection point to the fluid conveying device.

16. A system according to claim 1, wherein the pipeline is more flexible across at least one functional section than outside of the functional section.

17. A system according to claim 1, wherein the pipeline has a thinner wall thickness across at least one functional section than outside of the functional section or wherein the pipeline is designed as a bellows pipe across at least one functional section.

18. A system according to claim 1, wherein the fluid conveying device is located at least partially, or completely, in a gusset, which is formed by a smallest imaginary cuboid over the inner tank or the outer container.

19. A system comprising a vehicle and a cryogenic container carried along on the vehicle and comprising an inner tank and an outer container which is vacuum-insulated relative to said inner tank, the system furthermore comprising a fluid conveying device and a pipeline that is routed out of the inner tank for the removal of cryogenic fluid and is connected to the fluid conveying device, wherein the fluid conveying device is arranged outside of the inner tank, the pipeline comprises a thermal siphon with at least one section rising towards the fluid conveying device, which is at least partially arranged in an area that is insulated with respect to the cryogenic fluid located in the inner tank, and wherein a vent line that can be closed by a valve in said area, on a removal level of the fluid conveying device, is connected to the pipeline or directly to the fluid conveying device and is routed back into the inner tank above the connection point to the pipeline or above the connection point to the fluid conveying device, wherein the section rising towards the fluid conveying device is at least partially arranged inside the cladding pipe, wherein the vent line is connected to the pipeline within the cladding pipe, is routed out of the cladding pipe inside the inner tank and is routed out of the inner tank with a separate cladding vent pipe.

* * * * *